July 9, 1963 H. N. DITTRICH 3,096,796

LEAD SPIRALING TOOL

Filed June 20, 1960

Henry N. Dittrich
INVENTOR.

BY Clarence A. O'Brien
and Harvey B. Jacobson
Attorneys

United States Patent Office 3,096,796
Patented July 9, 1963

3,096,796
LEAD SPIRALING TOOL
Henry N. Dittrich, 1101 N. East St., Edna, Tex.
Filed June 20, 1960, Ser. No. 37,176
8 Claims. (Cl. 140—124)

This invention relates generally to a tool designed for use by technicians in the electronic service or maintenance industry and more particularly to a tool used for the purpose of winding spiral sleeves on connecting lead wires on condensers and resistors that are to be installed when replacing defective components on printed circuit boards of electronic equipment.

Extreme difficulty is often encountered when working with printed circuit boards in establishing good mechanical and electrical connections between circuit components. Because of the limited working space generally available and the crowded conditions on most printed circuit boards, the technicians must often spend considerable time in establishing the necessary mechanical and electrical connections. In the light of this, it is the principal object of this invention to provide a novel tool construction utilized for the purpose of winding spiral sleeves on connecting lead wires on circuit components for facilitating the installation and replacement of components on printed circuit boards, Use of the tool enables spiral sleeves to be formed on lead wires which in turn permit extremely good mechanical and electrical connections in a minimum of time.

After a defective component is removed from a printed circuit board, it is often difficult to replace the component inasmuch as only a short stub lead remains, By forming a spiral sleeve on the lead of the new component, the sleeve may be slipped over the short stub lead remaining on the circuit board and the connection so formed may be easily soldered leaving a neat and secure formation. Present practice requires the formation of hooked ends on the short stub leads on the circuit board which are hooked to the hooked ends formed on the new components. Where the circuit board is crowded, such a procedure is difficult to employ advantageously.

It is a more particular object of this invention to provide a novel tool for facilitating the winding of spiral sleeves on connecting lead wires which may be satisfactorily utilized with several different wire sizes. Moreover, it is an object of this invention to provide a novel tool construction which may be compactly formed so that it may be conveniently carried in the shirt pocket of a technician. The construction of the tool is extremely simple and accordingly is inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4, 5, 6, 7, 8:
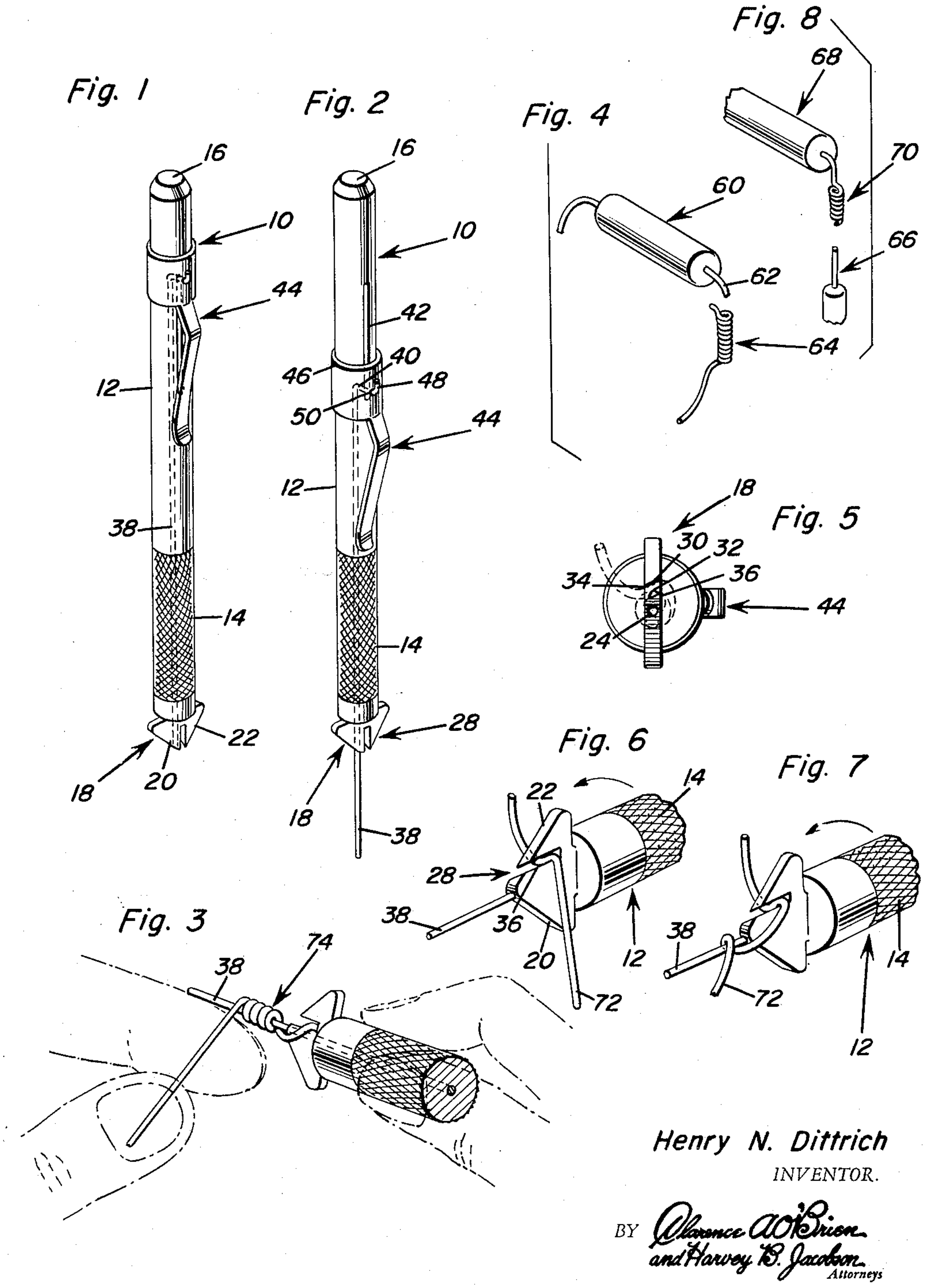
FIGURE 1 is a perspective view of the tool construction showing the winding shaft thereof withdrawn into the tool shank.
FIGURE 2 is a perspective view of the tool construction showing the winding shaft thereof projected from the tool shank.
FIGURE 3 is a fragmentary perspective view illustrating the manner in which a connecting lead wire is utilized in conjunction with the tool head for spiraling the wire lead about the winding shaft.
FIGURE 4 is a perspective representation illustrating the manner in which a short stub lead on a circuit component may be inserted into a spiral sleeve formed on a wire lead.
FIGURE 5 is an end elevational view of the tool showing the manner in which a wire lead is passed through the slot defined in the tool head and wound around the winding shaft.
FIGURE 6 is a fragmentary perspective view showing the manner in which the wire lead may be initially engaged in the slot defined in the tool head for initiating the spiraling of the lead.
FIGURE 7 is a fragmentary perspective view illustrating the first turn of the spiral formed on the wire lead.
FIGURE 8 shows in perspective the manner in which a component lead may be formed into a spiral sleeve receivable over a stub lead for being soldered thereto.

With continuing reference to the drawings, numeral 10 generally represents the tool comprising this invention and including a cylindrical tool shank 12 which may be formed of most any metal tubing. The external surface of the shank 12 is knurled at 14 at the forward end thereof. Although the precise dimensions of the shank of course are to be dictated by individual consideration, it has been found that a length of five inches and a diameter of three-eighths of an inch serve effectively for the purposes contemplated.

The tubular shank 12 is closed at the rear end thereof by a pulg 16. A tool head 18 is terminally carried at the forward end of the shank 12. The tool head 18 is flat and defines a pair of converging end surfaces 20 and 22. A bore 24 extends longitudinally through the flat head 20 substantially in alignment with the vertex or junction defined by the converging end surfaces 20 and 22. A longitudinally extending slot 28 is defined in the head 18 spaced slightly from the bore 24. Edges 30 and 32 on the head 18 border on the slot 28. The edges 30 and 32 are sloped or angled with respect to the flat head 18. It is to be noted that the slot 28 slopes toward the bore 24 with sharp corner angles being defined at 34 and 36 between the edges 30 and 32 and the flat faces of the head 18.

A winding shaft 38 is disposed in the tubular shank 12 in alignment with the bore 24. The shaft 38 extends through the tubular shank 12 and is offset at 40 so as to project through a longitudinal slot 42 defined in the shank 12. A resilient pocket clip 44 is provided with a collar 46 receivable on the cylindrical and tubular shank 12. An offset terminal portion of the shaft 38 projects through an aperture 50 formed in the collar 46. It will be appreciated that when the resilient clip 44 is disposed on the shank 12 in the position indicated in FIGURE 1, the shaft 38 will be retained completely within the shank 12. However, when it is desired to utilize the tool 10 and project the winding shaft 38 from the head 18 through the bore 24, manual downward pressure may be applied on the resilient clip 44 so as to cause the offset portion 40 of the shaft 38 to ride in the slot 42 to project the shaft 38 forwardly through the bore 24 of the head 18.

It is desired to form a sprial sleeve on a wire lead. Suggested applications of why this is desirable are illustrated in FIGURES 4 and 8. In FIGURE 4 a circuit component 60 is shown having a short stub lead 62 remaining thereon. With normal servicing procedure, it is difficult to connect the short stub lead 62 so as to form a proper mechanical and electrical connection. In order to facilitate connection of the stub lead 62 a spiral lead 64 should be formed so that the stub lead 62 may be projected thereinto with solder being applied to the combination for establishing a firm mechanical and electrical connection.

In FIGURE 8 a short stub lead 66 remains on, for example, a circuit board after a defective component has been removed. In order to connect a new component 68 thereto, a spiral sleeve 70 is formed on the wire lead of the component 68 and slipped over the stub lead 66 and soldered for establishing a firm electrical mechanical connection.

Attention is now called to FIGURES 3, 6 and 7 wherein the procedure for forming the spiral sleeve is illustrated. It is preferable to hold the shank 12 in the right hand with the hand gripping the knurled portion 14 of the shank. A wire lead 72 is extended through the angularly extending slot 28 as shown in FIGURE 6. The shank 12 is then rotated in a direction indicated by the arrow in FIGURE 6 so that the sharp edge 36 of the slot causes the lead 72 to bend. The lead 72 rides down the converging end surface 20 toward the winding shaft 38. After one complete turn of the shank 12, the lead 72 has formed the first turn of a spiral about the shaft 38. This first turn is illustrated in FIGURE 7 and an arrow is shown to indicate the direction of further rotation of the shank 12. By continuing to rotate the shank 12, the lead 72 may be wound into a tight spiral 74 illustrated in FIGURE 3. When so formed, it may be slipped off the shaft 38 and utilized as suggested in FIGURES 4 and 8.

The plug 16 may be removable is desired so that steel wire bits or such may be retained within the tubular shank 12. It will be appreciated that the tool disclosed herein will eliminate considerable difficulty involved in routine service jobs and reduce cost and expense connected therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for spiraling flexible leads comprising a handle having a central longitudinal axis, a flat head secured to one end of said handle and having opposite side edges converging together in a direction away from said handle towards said axis, said converging edges terminating at a point substantially on said axis, a winding shaft, separate from and more rigid than the leads to be spiraled, connected to the handle and extending through a passage formed in said head, said passage terminating at said point and being substantially concentric with said axis, said head being provided with a notch which extends generally parallel to said passage but spaced therefrom, said notch having an exposed open end whereby one end of the lead may be inserted therein and the remainder of the lead wrapped about said shaft to form a spiral coil.

2. A tool for spiraling flexible leads comprising a handle having a central longitudinal axis, a flat head secured to one end of said handle and having opposite side edges converging together in a direction away from said handle towards said axis, said converging edges terminating at a point substantially on said axis, a winding shaft, separate from and more rigid than the leads to be spiraled, connected to the head at said point, said winding shaft extending away from said head along said axis, said head being provided with a notch which extends generally parallel to said axis but spaced therefrom, said notch having an exposed open end whereby one end of the lead may be inserted therein and the remainder of the lead wrapped about said shaft to form a spiral coil.

3. A tool as defined in claim 1 wherein said shaft is shorter than the total length of the head and handle, said passage extending into said handle, said shaft being slidably mounted in said passage, means for selectively retracting and extending said shaft into and out of said passage, and means limiting the extension and retraction of said shaft.

4. A device as defined in claim 3 wherein said handle includes a longitudinally extending elongated slot therein, said means for selectively retracting and extending said shaft consisting of a resilient clip slidably mounted on the exterior of said handle and rigidly connected to said shaft through said slot, the ends of the slot constituting the means for limiting the extension and retraction of the shaft.

5. A tool for spiralling flexible leads comprising a handle having a central longitudinal axis, a head secured to one end of said handle and having opposite side surfaces converging together in a direction away from said handle toward said axis, said converging sides terminating at a point substantially on said axis, a winding shaft, separate from and more rigid than the leads to be spiraled, connected to the handle and extending through a passage formed in said head, said passage terminating at said point and being substantially concentric with said axis, said head being provided with a notch which extends generally parallel to said passage but spaced therefrom, said notch having an exposed open end whereby one end of the lead may be inserted therein and the remainder of the lead wrapped about said shaft to form a spiral coil, said shaft being shorter than the total length of the head and handle, said passage extending into said handle, said shaft being slidably mounted in said passage whereby it may be selectively retracted and extended into and from said passage, a resilient pocket clip being slidably mounted on the exterior of said handle, and means rigidly connecting said clip to said shaft whereby the clip may be used as an operator to retract and extend the shaft and as a means for securing the tool to a pocket in clothing, said handle comprising an elongated cylinder having a knurled surface spaced from said clip.

6. A tool as defined in claim 5 wherein said axis bisects the angle formed between said side surfaces.

7. A tool as defined in claim 6 wherein said notch opens into one of said converging side surfaces.

8. A tool for spiraling flexible leads comprising an elongated cylindrical handle having a knurled surface adjacent the forward end thereof, a winding shaft, a longitudinal passage extending through the handle and opening at the forward end thereof, said shaft being received within said passage, a notch in the forward end laterally spaced from the shaft, said shaft being slidably mounted in said passage, and means for selectively retracting and extending said shaft through the open forward end of the passage, said last mentioned means consisting of a resilient clip slidably mounted on the exterior of the cylindrical handle at a point spaced from the knurled surface, an elongated longitudinally extending slot in said cylindrical handle, and means rigidly connecting the clip to the shaft through the slot.

References Cited in the file of this patent

UNITED STATES PATENTS

| | | |
|---|---|---|
| 1,047,934 | Griffin | Dec. 24, 1912 |
| 1,049,361 | Holmes | Jan. 7, 1913 |
| 2,421,878 | Gubser et al. | June 10, 1947 |
| 2,585,010 | Hickman et al. | Feb. 12, 1952 |
| 2,631,617 | Drayer | Mar. 17, 1953 |
| 2,682,063 | Miloche | June 29, 1954 |
| 2,688,449 | Haagensen | Sept. 7, 1954 |
| 2,914,261 | Barnes | Nov. 24, 1959 |
| 3,064,695 | Strohmaier et al. | Nov. 20, 1962 |